United States Patent [19]

Zindler

[11] Patent Number: 4,705,148
[45] Date of Patent: Nov. 10, 1987

[54] CLUTCH BRAKE ASSEMBLY
[75] Inventor: Hugh A. Zindler, Long Beach, Calif.
[73] Assignee: Valley Industries, Inc., Seattle, Wash.
[21] Appl. No.: 683,915
[22] Filed: Dec. 18, 1984
[51] Int. Cl.[4] .............................................. F16D 51/62
[52] U.S. Cl. .................................. 192/8 R; 160/298; 188/82.2; 188/82.8; 192/43
[58] Field of Search ............................ 188/82.2, 82.8; 192/8 R, 43, 45.1; 160/291, 298, 305; 135/89

[56] References Cited

U.S. PATENT DOCUMENTS

| | | | |
|---|---|---|---|
| 267,638 | 11/1882 | Wright | 188/82.8 |
| 1,788,317 | 1/1931 | Morier et al. | 192/45.1 |
| 2,236,314 | 3/1944 | Goodenough et al. | 192/43 |
| 2,583,428 | 1/1952 | Houplain | 192/8 R |
| 2,762,478 | 9/1956 | Winger | 192/43 |
| 2,849,089 | 8/1958 | Lindmark | 188/82.2 |
| 3,019,682 | 2/1962 | Hare | 192/43 X |
| 3,447,650 | 6/1969 | Dossier | 188/82.8 X |
| 3,870,096 | 3/1975 | Herrell | 160/305 |
| 4,524,791 | 6/1985 | Greer | 188/82.2 X |

FOREIGN PATENT DOCUMENTS

| | | | |
|---|---|---|---|
| 494680 | 11/1950 | Belgium | 192/45.1 |
| 839402 | 4/1939 | France | 192/45.1 |
| 114877 | 9/1945 | Sweden | 192/8 R |

Primary Examiner—Rodney H. Bonck
Attorney, Agent, or Firm—Townsend & Townsend

[57] ABSTRACT

A clutch brake assembly which may be used for roll up awnings and the like which will allow the roller on which the awning is rolled to freely rotate in one direction and be locked against rotation in the other direction, the directions of freewheeling rotation and locking being selectable by manual rotation of the cover between either of two toggle positions. The assembly includes a nonrotatable shaft extending through the assembly and fastened by arms to the side of a recreational vehicle or the like. Mounted on the shaft is a rotatable drum on which the awning is to be rolled and unrolled, that drum having a clutch drum attached thereto. Mounted within the clutch drum and rotatable with an actuating cover is a pair of substantially radially movable clutch shoes, each positioned with respect to one cam surface of a double acting cam fastened to the shaft. The actuating cover includes an overcenter toggle device operating in conjunction with the shaft to encourage the cover to either one of two stable positions, causing one or the other of the clutch shoes to engage the associated cam surface of the double acting cam to force the shoe firmly against the clutch drum. Rotation in one direction is allowed however, as such rotation allows the cam surface to release pressure on the clutch shoe, whereas attempted rotation in the opposite direction causing a locking action.

12 Claims, 4 Drawing Figures

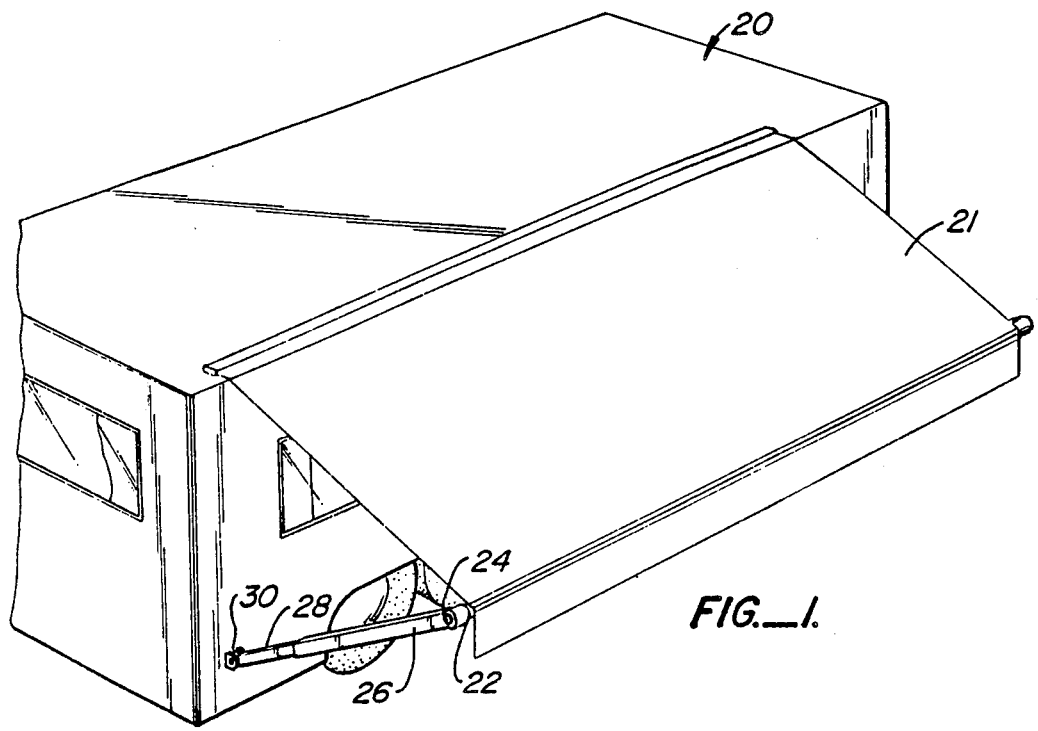
FIG._1.
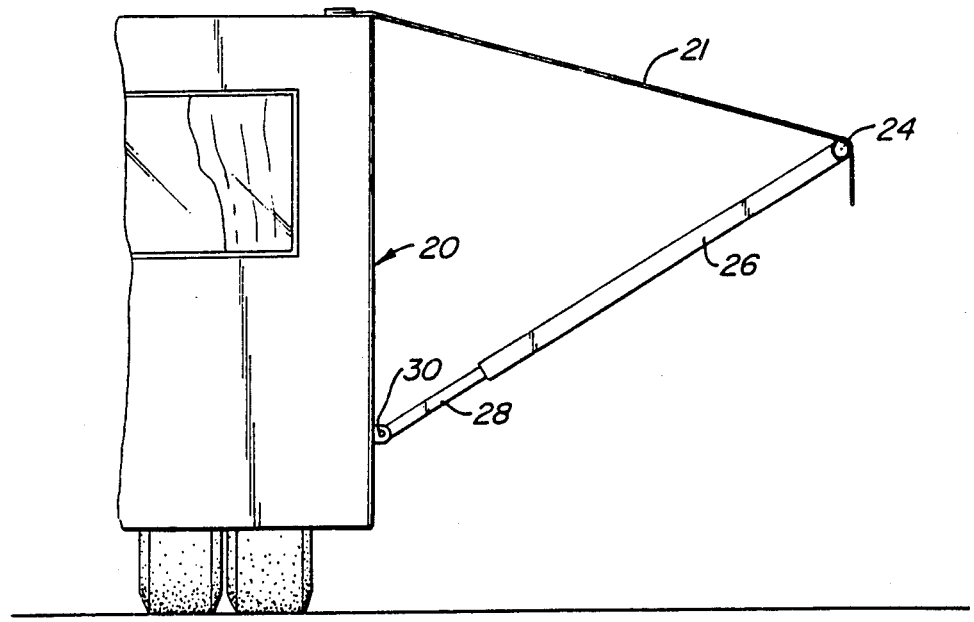
FIG._2.

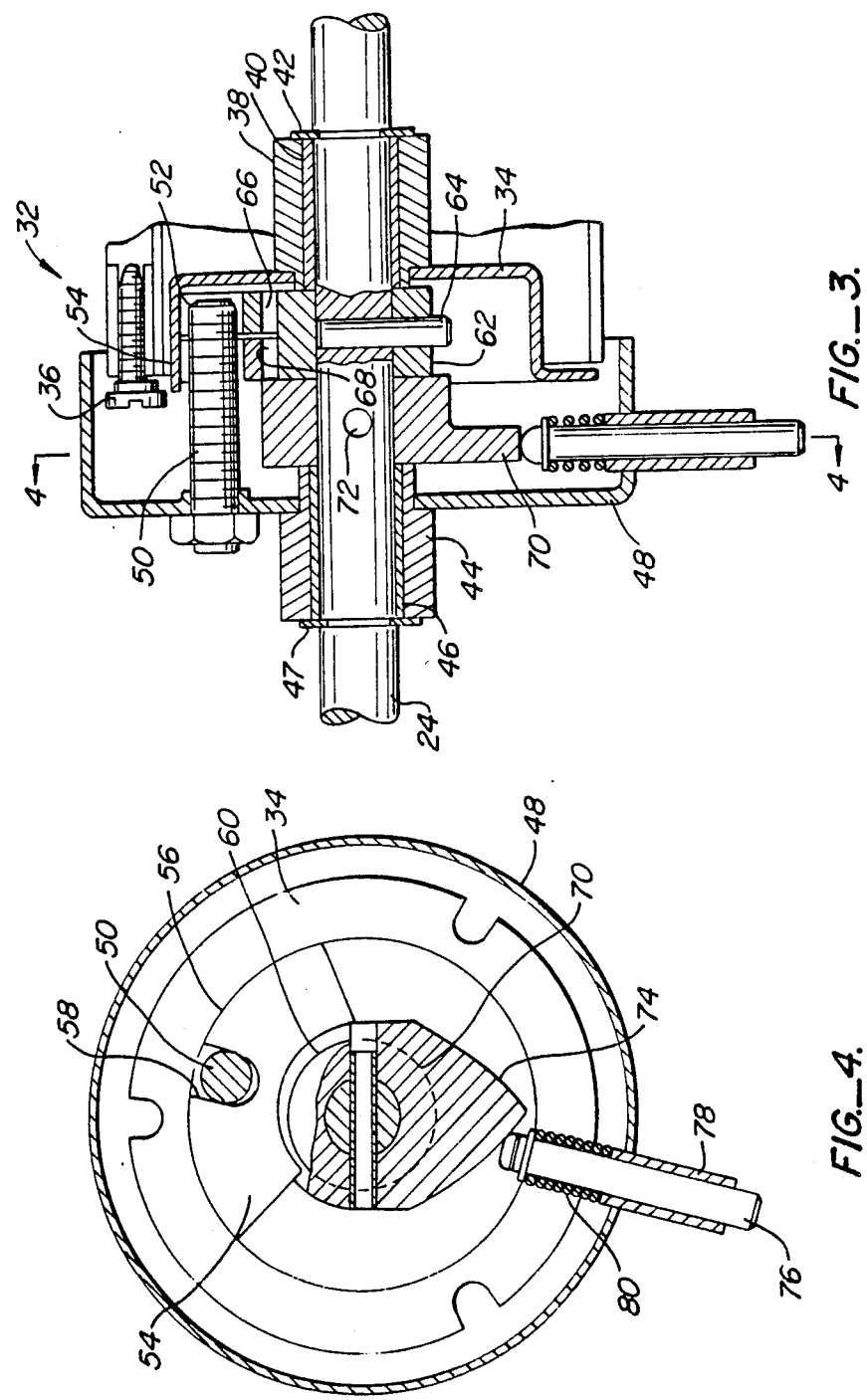

CLUTCH BRAKE ASSEMBLY

BACKGROUND OF THE INVENTION

1. Field of the Invention.

The present invention relates to the field of clutch brake assemblies.

2. Prior Art.

For mobile homes, trailers and the like, it is advantageous to have an awning which will provide a shaded and protected area at the side of the vehicle. For this purpose, awning assemblies have been used wherein a horizontal roller is rotatably supported on a shaft by a pair of support arms, the arms being pivotably supported in fore and aft positions adjacent the lower portion of the vehicle. The awning itself has its inner edge attached adjacent the top of the side of the vehicle, with the opposite edge thereof attached to the roller so as to enable the rolling and unrolling of the awning onto and off of the roller. In this manner the awning can be rolled up onto the roller for stowing, which of course will cause the support arms to themselves lie substantially flat against the side of the vehicle. When locked or retained in the rolled up position, the vehicle may be operated at highway speeds without damaging the awning or awning mechanism. In use the awning is simply released and the support arms pulled outward to unroll the awning and support the awning outward from the side of the vehicle.

For convenience in rolling up such an awning assembly, a coil spring may be provided within the roller, coupled in torsion about the axis of the coil spring, so as to provide a self winding action much like a window shade roller spring. In so doing however, one needs some form of relatively positive lock to maintain the awning in the rolled up position, adequate to resist wind forces encountered during transit at highway speeds. On the other hand, when the awning is to be used, such a locking mechanism must be released, it being also desirable to inhibit the tendency of the spring to roll up the awning so that it will not snap back when partially unrolled, and need not be weighted or tied down when fully unrolled. For this purpose, a Locking Device for Roll Up Awnings is shown in U.S. Pat. No. 3,870,096. In that device, a brake is mounted on a lever and within a brake drum, the lever being rotatable between first and second positions and encouraged to either of those two positions by an over center spring. When in either of the two positions, attempted rotation of the drum with respect to the brake in one direction will cause the brake to jam tightly against the drum to prevent such rotation, rotation in the opposite direction effectively releasing the pressure of the brake on the drum, except for the overcenter spring, thereby allowing the drum to rotate with respect thereto. Positioning the lever in the other stable position effectively reverses the operation of the mechanism, reversing the rotational directions of freewheeling and locking.

There are, of course, other applications for such devices. By way of example, conveyors are sometimes used in either of two directions, such as for both loading and unloading trucks. Frequently it would be convenient or enhance safety if the conveyor could be allowed to roll in the desired direction, but resist movement in the opposite direction, a function easily and economically accomplished with the present invention.

BRIEF SUMMARY OF THE INVENTION

A clutch brake assembly which may be used for roll up awnings and the like, which will allow the roller on which the awning is rolled to freely rotate in one direction and be locked against rotation in the other direction, the directions of freewheeling rotation and locking being selectable by manual rotation of the cover between either of two toggle positions. The assembly includes a nonrotatable shaft extending through the assembly and fastened by arms to the side of a recreational vehicle or the like. Mounted on the shaft is a rotatable drum on which the awning is to be rolled and unrolled, that drum having a clutch drum attached thereto. Mounted within the clutch drum and rotatable with an actuating cover is a pair of substantially radially movable clutch shoes, each positioned with respect to one cam surface of a double acting cam fastened to the shaft. The actuating cover includes an overcenter toggle device operating in conjunction with the shaft to encourage the cover to either one of two stable positions, causing one or the other of the clutch shoes to engage the associated cam surface of the double acting cam to force the shoe firmly against the clutch drum. Rotation in one direction is allowed however, as such rotation allows the cam surface to release pressure on the clutch shoe, whereas attempted rotation in the opposite direction causing a locking action as a result thereof, the directions of rotation and locking being manually reversible by manually positioning the cover in the other stable position. Other applications of the invention include conveyor systems and the like, both as a clutch brake assembly with a stationary reference and as a drive element to allow freewheeling with respect to the drive.

BRIEF DESCRIPTION OF THE DRAWINGS

FIG. 1 is a prospective view of a mobile home illustrating a typical application of the present invention;

FIG. 2 is an end view of the awning and associated mechanism as well as a portion of the mobile home of FIG. 1;

FIG. 3 is a partial cross section of the cover actuated clutch brake assembly of the present invention; and FIG. 4 is a partial cross section of the cover actuated clutch brake assembly of the present invention taken along line 4—4 of FIG. 3.

DETAILED DESCRIPTION OF THE INVENTION

First referring to FIGS. 1 and 2, a mobile home with one embodiment of the present invention mounted thereon may be seen. In these figures the mobile home 20 has a fabric awning 21 attached to the side adjacent the top thereof, with the region adjacent the other edge of the awning being fastened to a roller 22 thereunder. The roller is supported by a shaft 24 nonrotatably coupled to arms 26, which arms, if desired to provide greater extension capability of the awning, may have a second telescoping portion 28 rotatably supported in fore and aft lower positions on the vehicle by supports 30.

FIG. 2 illustrates the awning and associated mechanism when extended for use. Like the prior art, the purpose of the invention is to provide a clutch for the roller 22 which is manually controllable to prevent the unrolling of the awning when in a rolled up position for transport, the rolling up of the awning when in use, the inadvertent unrolling of the awning when being rolled up, and finally, the inadvertent rolling up of the awning when being unrolled. The present invention mechanism for doing this is illustrated in detail in FIGS. 3 and 4.

Referring to FIG. 3, a cross section of the clutch assembly, generally indicated by the numeral 32 may be seen. The roller or drum 22 on which the awning 21 is rolled is coupled to a clutch drum 34 by way of screws 36, the clutch drum itself being rotatably supported by the stationary shaft 24 through hub 38 and bushing 40. This assembly is longitudinally located at one end by snap ring 42 and at the other end by double acting cam member 62 to be subsequently described.

Opposite the hub 38 and bushing 40 supporting the clutch drum and roller is another hub 44 with bushing 46 therein, retained by second snap ring 47, hub 44 supporting a cover 48 extending somewhat over the end of the roller 22. Fastened to the cover 48 is a pin 50, the pin extending within the cover 48 substantially parallel to the shaft 24 and within the clutch drum 34. Also located within the clutch drum and retained by pin 50 engaging slots 58 therein are a pair of shoes 52 and 54, shoe 54 being shown in end view in the partial cross section of FIG. 4. The shoes 52 and 54 are identical in configuration, in that each has an inner and outer face, an outer surface 56 of a concentric circular arc interrupted by a slot 58 within which pin 50 rides, and an inner cam follower surface 60 not concentric with the axis of the assembly. The two shoes 52 and 54 are mounted in the assembly in an inner face to inner face relationship, as opposed to an inner face to outer face relationship, so that the eccentricities of the inner surfaces 60 of the two shoes are not aligned, but rather are opposite each other.

Rigidly mounted to the shaft 24 at the same axial position as the shoes 52 and 54 is a double acting cam member 62, the cam member being coupled to the shaft by a roll pin 64. The double acting cam 62 has thereon first and second cam surfaces 66 and 68, having eccentricities cooperating with the eccentricity of the surfaces 60 of the two shoes. Thus with this arrangement, with shaft 24 stationary, when cover 48 is rotated in one direction, the two shoes rotate therewith because of the action of pin 50 in the slots 58 therein. This causes one of shoes 52 and 54 to slide up the associated one of cam surfaces 66 and 68 of the double acting cam 62, to force that shoe radially outward with respect to the cover and against the inner surface of the clutch drum. At the same time, the second shoe will be given an increased amount of radial clearance between its associated cam and the clutch drum to itself not interfere with the rotation of the clutch drum.

Also rigidly mounted on the shaft 24 is a cam actuator 70 coupled to the shaft by a second roll pin 72. As may be seen in FIGS. 3 and 4, the cam actuator has a single lobe cam-like extension 74 acting against a pin 76 mounted in a pin housing 78 radially supported on cover 48, the pin being spring loaded by spring 80 against the lobe 74 of the cam actuator 70. The cam actuator 70 is also of sufficient diameter opposite the lobe to at least extend over the inner edge of shoe 54 to retain the two shoes within the clutch drum as shown.

In FIG. 4, the cover 48 is shown in the extreme of its clockwise rotation, the shoe 54 having a radial looseness as a result of the cam action on the inner surface thereof, though shoe 52 is at the same time wedged outward against the drum to resist rotation thereof in either direction. However, if one attempts to rotate the roller 22 and thus the clutch drum 34 in a counterclockwise direction as viewed in FIG. 4, the shoe 52 wedged against the drum by the cam actuator 70 will tend to rotate slightly with the clutch drum, rotating the cover slightly until pressure on the shoe initially wedged against the drum is released by its associated cam surface to allow the drum to rotate with respect thereto. Thus for rotation of the roller 42 and clutch drum 34 in a counterclockwise direction, the assembly of the present invention as shown in FIGS. 3 and 4 will merely provide some nominal drag to such rotation, a generally desirable characteristic for such assemblies in the intended application. In that regard, when the word "freewheeling" is used herein, it is used in the sense of allowing rotation in one direction, even though that rotation may be subject to some drag thereon.

When one attempts to rotate the roller 22 and thus the clutch drum 34 in the clockwise direction as shown in FIG. 4, shoe 54 forced thereagainst again tends to cause the cover to rotate therewith. However, the motion induced further jams the shoe against the clutch drum, locking the assembly and preventing any significant rotation in that direction.

Finally, if one manually rotates the cover 48 from the position shown in FIG. 4 to the counter clockwise position the action of the two shoes 66 and 68 is reversed, as are the directions of locking and freewheeling hereinbefore described. Thus it may be seen that by manually rotating the cover between the two stable positions, one can reverse the rotation directions of locking and freewheeling in an easily controllable manner. Obviously, for the assembly to function as desired, the spring loaded pin 76, together with the cam actuator 70, must in effect operate as an over center mechanism forcing one or the other shoe against the clutch drum dependent upon which stable extreme the over center mechanism is placed.

The present invention has been disclosed and described herein with respect to a manually operable cover actuated clutch brake assembly for roll up awnings, though the invention may well be used in different ways and for other applications. By way of example, the cover member may be actuated through some additional control mechanism such as, by way of example, through a control rod or by remote control, utilizing hydraulic, electric or other means. The invention may also be used in other applications such as, by way of example, in conveyor systems. In one such application it may be desired to use a conveyor in either direction without requiring the swapping of the conveyor end for end. In a manual conveyor the present invention might be used on each roller, or alternatively, on the belt conveyor at one end of the belt to allow belt motion in one selectable direction and not in the other. Obviously, while the cover and the over center mechanism of the preferred embodiment disclosed herein extend radially outward beyond the diameter of the awning roller, such a configuration is not a specific limitation of the invention, as the cover and over center mechanism may be reproportioned and/or reconfigured to fall well within the outer diameter of any appropriate member connected to the clutch drum. In the case of a driven conveyor, the present invention clutch brake assembly could be used as part of the drive mechanism. By way of example, shaft 24 might be driven by an appropriate gear motor with the conveyor being driven by a belt, sprocket or pulley coupled to the clutch drum to allow freewheeling of the conveyor in the selected drive direction at speeds exceeding the speed of the drive, and to allow manual movement of the conveyor in the desired direction.

Thus, while the preferred embodiment of the present invention has been disclosed and described in detail herein, it will be obvious to those skilled in the art that various changes in form, detail and application thereof may be made without departing from the spirit and scope of the invention.

I claim:

1. A cover actuated clutch brake assembly for awning apparatus comprising
    a shaft;
    a clutch drum coupled to a roller member rotatably supported on said shaft for rolling an awning thereon and unrolling the awning therefrom;
    a cover rotatably supported on said shaft substantially coaxial with and adjacent said clutch drum;
    clutch means within said clutch drum restraining relative rotation therebetween when said clutch means is forced against said clutch drum;
    guide means coupled to said cover for guiding said clutch means in radial motion with respect thereto and preventing substantial rotation of said clutch means with respect thereto;
    first cam means coupled to said shaft and cooperatively disposed with respect to said clutch means to force said clutch means radially outward against said clutch drum upon rotation of said clutch means with respect to said shaft in either of first and second directions relative to a neutral position; and
    over center means coupled between said cover and said shaft for encouraging said cover in either of said first and second directions relative to a neutral position corresponding to said neutral position of said clutch means.

2. The clutch brake assembly of claim 1 wherein said over center means comprises a second cam means coupled to said shaft, and a spring loaded cam follower coupled to said cover and cooperatively engaging said second cam means.

3. The clutch brake assembly of claim 1 wherein said clutch means comprises first and second clutch members each having an inner and outer face and disposed in an inner face to inner face relationship.

4. The clutch brake assembly of claim 3 wherein said first cam means comprises means having first and second cam surfaces, said first cam surface being operative to force said first clutch member outward against said clutch drum upon relative rotation of said first and second clutch members with respect to said shaft in said first direction, and said second cam surface being operative to force said second clutch member outward against said clutch drum upon relative rotation of said first and second clutch members with respect to said shaft in said second direction.

5. The clutch brake assembly of claim 1 wherein said guide means comprises a pin coupled to said cover and extending substantially parallel to said shaft into a substantially radial slot in said clutch means.

6. A cover-actuated clutch brake assembly for awnings comprising
    a support means;
    a clutch drum coupled to a roller member rotatably supported on said support means for rolling an awning thereon and unrolling the awning therefrom;
    a control means comprising a cover supported on said support means and at least partially rotatable about an axis substantially coaxial with and adjacent said clutch drum;
    clutch means within said clutch drum restraining relative rotation therebetween when said clutch means is forced against said clutch drum;
    guide means coupled to said control means for guiding said clutch means in radial motion with respect thereto and preventing substantial rotation of said clutch means with respect thereto;
    a first cam coupled to said shaft and having first and second oppositely acting surfaces, each of said first and second cam surfaces being cooperatively disposed with respect to adjacent surfaces of said clutch means to force said clutch means radially outward against said clutch drum upon rotation of said clutch means with respect to said shaft in either of first and second directions relative to a neutral position; and
    over center means coupled between said cover and said shaft for encouraging said cover in either of said first and second directions relative to a neutral position corresponding to said neutral position of said clutch means, said over center means comprising a second cam means coupled to said shaft and a single spring loaded cam follower coupled to said cover.

7. The clutch brake assembly of claim 6 wherein said clutch means comprises first and second clutch members each having an inner and outer face and disposed in an inner face to inner face relationship.

8. A cover-actuated clutch brake assembly comprising
    a shaft;
    a clutch drum rotatably supported on said shaft;
    control means comprising a cover supported on said shaft adjacent said clutch drum for rotation in first and second directions;
    clutch means within said clutch drum restraining relative rotation therebetween when said clutch means is forced against said clutch drum;
    guide means coupled to said control means for guiding said clutch means in radial motion with respect thereto and preventing substantial rotation of said clutch means with respect thereto;
    first cam means coupled to said shaft and cooperatively disposed with respect to said clutch means to force said clutch means radially outward against said clutch drum upon rotation of said clutch means with respect to said shaft in either of said first and second directions relative to a neutral position; and
    over center means coupled between said control means and said shaft for encouraging said control means in either of said first and second directions relative to a neutral position corresponding to said neutral position of said clutch means said over center means comprising a second cam means coupled to said shaft and a single spring loaded cam follower coupled to said cover for cooperatively engaging said second cam means.

9. The clutch brake assembly of claim 8 wherein said clutch means comprises first and second clutch members each having an inner and outer face and disposed in an inner face to inner face relationship.

10. The clutch brake assembly of claim 9 wherein said first cam means comprises means having first and second cam surfaces, said first cam surface being operative to force said first clutch member outward against said clutch drum upon relative rotation of said first and second clutch members with respect to said shaft in said first direction, and second cam surface being operative to force said second clutch member outward against said clutch drum upon relative rotation of said first and second clutch members with respect to said shaft in said second direction.

11. The clutch brake assembly of claim 8 wherein said guide means comprises a pin coupled to said control means and extending substantially parallel to said shaft into a substantially radial slot in said clutch means.

12. A cover actuated clutch brake assembly comprising a support means;

a clutch drum rotatably coupled to said support means;

a control means comprising a cover supported on said support means for at least partial rotation about an axis substantially coaxial with and adjacent said clutch drum in first and second directions and having stable positions at the extreme of its rotation in each of said first and second direction;

clutch means within said clutch drum restraining relative rotation therebetween when said clutch means is forced against said clutch drum;

guide means disposed within and coupled to said control means for guiding said clutch means radial motion with respect thereto and preventing substantial rotation of said clutch means with respect thereto; and a first cam coupled to said support means and having first and second oppositely acting surfaces, each of said first and second cam surfaces being cooperatively disposed with respect adjacent surfaces of said clutch means to force said clutch means radially outward against said clutch drum upon rotation of said clutch means with respect to said support means in either of first and second directions relative to a neutral position, over center means comprising a second cam means coupled to said support means and a single cam follower coupled to said cover and cooperating engaging said second cam means, said over center means encouraging said cover in either of said first and second directions.

* * * * *